United States Patent
Stachurski et al.

(10) Patent No.: US 10,972,837 B2
(45) Date of Patent: Apr. 6, 2021

(54) ROBUST ESTIMATION OF SOUND SOURCE LOCALIZATION

(71) Applicant: Texas Instruments Incorporated, Dallas, TX (US)

(72) Inventors: Jacek Piotr Stachurski, Dallas, TX (US); Lorin Paul Netsch, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/989,013

(22) Filed: Aug. 10, 2020

(65) Prior Publication Data
US 2020/0374628 A1 Nov. 26, 2020

Related U.S. Application Data

(63) Continuation of application No. 13/775,073, filed on Feb. 22, 2013.

(51) Int. Cl.
*H04R 3/00* (2006.01)
*H04M 3/56* (2006.01)
*H04N 7/15* (2006.01)

(52) U.S. Cl.
CPC ............ *H04R 3/005* (2013.01); *H04M 3/568* (2013.01); *H04N 7/15* (2013.01); *H04R 2430/03* (2013.01)

(58) Field of Classification Search
CPC ... H04R 3/005; H04R 2430/03; H04M 3/568; H04M 2242/30; H04N 7/15
See application file for complete search history.

(56) References Cited

U.S. PATENT DOCUMENTS

| | | |
|---|---|---|
| 2003/0176196 A1 | 9/2003 | Hall et al. |
| 2004/0190730 A1 | 9/2004 | Rui et al. |
| 2010/0177908 A1 | 7/2010 | Seltzer et al. |
| 2010/0315905 A1 | 12/2010 | Lee et al. |
| 2011/0019835 A1 | 1/2011 | Schmidt et al. |
| 2011/0096915 A1 | 4/2011 | Nemer |
| 2012/0294457 A1 | 11/2012 | Chapman et al. |

OTHER PUBLICATIONS

John Woodruff and DeLiang Wang, "Binaural Localization on Multiple Sources in Reverberant and Noisy Environments", IEEE Transactions on Audio, Speech, and Language Processing, vol. 20, No. 5, Jul. 2012, pp. 1503-1512.

(Continued)

*Primary Examiner* — Ping Lee
(74) *Attorney, Agent, or Firm* — Ebby Abraham; Charles A. Brill; Frank D. Cimino

(57) ABSTRACT

A method for sound source localization in a digital system having at least two audio capture devices is provided that includes receiving audio signals from the two audio capture devices, computing a signal-to-noise ratio (SNR) for each frequency band of a plurality of frequency bands in a processing frame of the audio signals, determining a frequency band weight for each frequency band of the plurality of frequency bands based on the SNR computed for the frequency band, computing an estimated time delay of arrival (TDOA) of sound for the processing frame using the frequency band weights, and converting the estimated TDOA to an angle representing sound direction.

5 Claims, 4 Drawing Sheets

(56) References Cited

OTHER PUBLICATIONS

Charles H. Knapp and G. Clifford Carter, "The Generalized Correlation Method for Estimation of Time Delay", IEEE Transactions on Acoustics, Speech, and Signal Processing, vol. ASSP-24, No. 4, Aug. 1976, pp. 320-327.

Michael S. Brandstein and Harvey F. Silverman, "A Robust Method for Speech Signal Time-Delay Estimation in Reverberant Rooms", Proceedings of the IEEE International Conference on Acoustics, Speech, and Signal Processing, vol. 1, Apr. 21-24, 1997, Munich, Germany, pp. 375-378.

Bo Qin et al, "Subsample Time Delay Estimation via Improved GCC PHAT Algorithm", ICSP 2008 9th International Conference on Signal Processing, Oct. 26-29, 2008, Beijing, China, pp. 2579-2582.

Hong Liu and Miao Shen, "Continuous Sound Source Localization Based on Microphone Array for Mobile Robots", The 2010 IEEE/RSJ International Conference on Robots and Systems, Oct. 18-22, 2010, Taipei, Taiwan, pp. 4332-4339.

Bowon Lee et al, "Maximum Likelihood Time Delay Estimation with Phase Domain Analysis in the Generalized Cross Correlation Framework", 2008 Workshop on Hands-Free Speech Communication and Microphone Arrays, May 6-8, 2008, Trento, Italy, pp. 89-92.

Shoko Araki et al, "A DOA Based Speaker Diarization System for Real Meetings", 2008 Workshop on Hands-Free Speech Communication and Microphone Arrays, May 6-8, 2008, Trento, Italy, pp. 29-32.

Heidi Christensen et al, "A Speech Fragment Approach to Localising Multiple Speakers in Reverberant Environments", Proceedings of the IEEE International Conference on Acoustics, Speech and Signal Processing, Apr. 19-24, 2009, Taipei, Taiwan, pp. 4593-4596.

Xiao Wu et al, "Location for Audio Signals Based on Empirical Mode Decomposition", Proceedings of the IEEE International Conference on Automation and Logistics, Aug. 5-7, 2009, Shenyang, China, pp. 1888-1891.

Bowon Lee and Ton Kalker, "Maximum a Posteriori Estimation of Time Delay, 2007 International Workshop on Computational Advances in Multi-Sensor Adaptive Processing", Dec. 12-14, 2007, St. Thomas, U.S. Virgin Islands, pp. 285-288.

Anthony Badali et al, "Evaluating Real-time Audio Localization Algorithms for Artificial Audition in Robotics", The 2009 IEEE/RSJ International Conference on Intelligent Robots and Systems, Oct. 11-15, 2009, St. Louis, MO, pp. 2033-2038.

Ali Pourmohammad and Seyed Mohammad Ahadi, "Real Time High Accuracy 3-D PHAT-Based Sound Source Localization Using a Simple 4-Microphone Arrangement", IEEE Systems Journal, vol. 6, No. 3, Sep. 2012, pp. 455-468.

ROBUST ESTIMATION OF SOUND SOURCE LOCALIZATION

CROSS-REFERENCE TO RELATED APPLICATIONS

This application is a continuation of U.S. patent application Ser. No. 13/775,073, filed Feb. 2, 2013, which is incorporated herein by reference in its entirety.

BACKGROUND OF THE INVENTION

Field of the Invention

Embodiments of the present invention generally relate to estimation of sound source localization.

Description of the Related Art

Localization of a sound source is of interest in many applications including robotics, security, communications, smart buildings, and assisted living. In such intelligent-environment applications, microphone arrays are used to track speakers and various other sounds of interest. While the sound localization problem has been studied extensively, a reliable low-complexity solution remains elusive.

Many sound source localization algorithms are based on the time difference of arrival (TDOA) of sound at two or more microphones. One of the most commonly used TDOA estimators employs Generalized Cross-Correlation with Phase Transform (GCC-PHAT). The GCC-PHAT estimator is attractive because this estimator tends to perform well in challenging environments, for example in the presence of reverberation. GCC-PHAT is described, for example, in C. H. Knapp and G. C. Carter, "The Generalized Correlation Method for Estimation of Time Delay," IEEE Transactions on Acoustics, Speech and Signal Processing, Vol. ASSP-24 (4), pp. 320-327, August 1976.

Several recent approaches aimed at improving accuracy of the TDOA estimate modify the GCC-PHAT weighting function. For example, in T. Qin, et al., "Subsample Time Delay Estimation via Improved GCC PHAT Algorithm," Proceedings of 9$^{th}$ International Conference on Signal Processing, pp. 2979-2982, Oct. 26-29, 2008, ("Qin"), an SNR-dependent exponent is applied to the weighting function. In H. Liu and M. Shen, "Continuous Sound Source Localization based on Microphone Array for Mobile Robots," IEEE/RSJ International Conference on Intelligent Robots and Systems, pp. 4339-4339, Oct. 18-22, 2010, ("Liu"), a bias term is added to the denominator. In Liu, and in B. Lee, et al., "Maximum Likelihood Time Delay Estimation with Phase Domain Analysis in the Generalized Cross Correlation Framework," Workshop on Hands-Free Speech Communication and Microphone Arrays, pp. 89-92, May 6-8, 2008, estimates of the phase statistics are used.

Other approaches, such as those described in S. Araki, et al., "A DOA based Speaker Diarization System for Real Meetings," Workshop on Hands-Free Speech Communication and Microphone Arrays, pp. 29-32, May 6-8, 2008, and H. Christensen, et al., "A Speech Fragment Approach to Localising Multiple Speakers in Reverberant Environments," Proceedings of the IEEE International Conference on Acoustics, Speech, and Signal Processing, pp. 4593-4596, Apr. 19-24, 2009, extend GCC-PHAT by calculating the TDOA in temporal and frequency bands followed by merging the estimates. Another approach described in B. Lee and T. Kalker, "Maximum A Posteriori Estimation of Time Delay," International Workshop on Computational Advances in Multi-Sensor Adaptive Processing, pp 285-288, Dec. 12-14, 2007, includes TDOA prior assumptions during estimation. To reduce the effects of noise, some approaches pre-process the input signals to remove unwanted signal components prior to applying GCC-PHAT. For example, in Liu, the pre-processing includes performing spectral subtraction and mean normalization. In X. Wu, et al., "Location for Audio Signals Based on Empirical Mode Decomposition," Proceedings of the IEEE International Conference on Automation and Logistics, Shenyang, China, pp. 1888-1891, August, 2009, the pre-processing includes decomposing the input signals using basis functions. In some approaches, the GCC-PHAT output is post-processed to obtain higher TDOA estimate accuracy, such as by applying interpolation functions during the search for the GCC-PHAT delay peak value as described in Qin.

SUMMARY

Embodiments of the present invention relate to methods, apparatus, and computer readable media for estimation of sound source localization. In one aspect, a method for sound source localization in a digital system having at least two audio capture devices is provided that includes receiving audio signals from the two audio capture devices, computing a signal-to-noise ratio (SNR) for each frequency band of a plurality of frequency bands in a processing frame of the audio signals, determining a frequency band weight for each frequency band of the plurality of frequency bands based on the SNR computed for the frequency band, computing an estimated time delay of arrival (TDOA) of sound for the processing frame using the frequency band weights, and converting the estimated TDOA to an angle representing sound direction.

In one aspect, a method for sound source localization in a digital system having at least two audio capture devices is provided that includes receiving audio signals from the two audio capture devices, computing an estimated time delay of arrival (TDOA) of sound for a processing frame of the audio signals, applying an adaptive inter-frame filter to the estimated TDOA, and converting the filtered estimated TDOA to an angle representing sound direction.

In one aspect, a digital system is provided that includes two audio capture devices for capturing audio signals, means for computing an estimated time delay of arrival (TDOA) of sound for a processing frame of the audio signals, means for applying an adaptive inter-frame filter to the estimated TDOA, and means for converting the filtered estimated TDOA to an angle representing sound direction.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
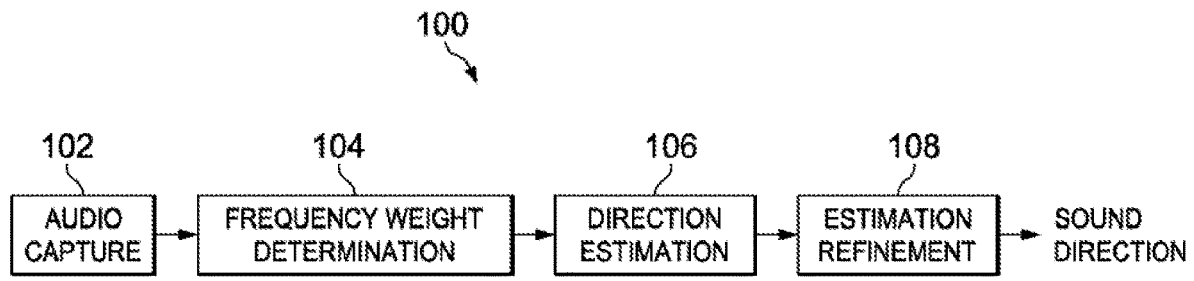
FIGS. 1 and 2 are block diagrams of a digital system.

Specific embodiments of the invention will now be described in detail with reference to the accompanying figures. Like elements in the various figures are denoted by like reference numerals for consistency.

The approaches mentioned above improve the TDOA accuracy of GCC-PHAT. However, real-time applications require not only an accurate, but also a stable and low-latency TDOA estimate in order to accomplish objectives such as, for example, focusing a camera in the direction of a sound. In such applications, estimation of the precise location of the sound source is often not as important as ensuring the stability of the estimate. Stable TDOA estimation often implies high sampling rates and processing large windows of data, which increases latency and consumes processing resources.

Embodiments of the invention provide low-resource sound source localization based on GCC-PHAT that produces more accurate and more stable sound direction estimates. TDOA estimates are known to exhibit anomalous behavior during short periods of silence and in noise. In some embodiments, a simplified low-complexity version of SNR-based spectral weighting is used to improve accuracy and stability in the presence of silence and/or noise. In some embodiments, an inter-frame adaptive filter is applied prior to determining the TDOA estimate which has been shown to substantially improve stability. In some embodiments, the direction estimation is refined by hysteresis and median-filter post-processing to improve performance.

For simplicity of explanation, example embodiments are described herein assuming the use of two microphones. One of ordinary skill in the art having benefit of this disclosure will understand embodiments in which more than two microphones are used. In such embodiments, estimates for microphone pairs may be determined as described herein and the results combined to determine the sound direction.

FIG. 1 shows a block diagram of a digital system 100 configured to perform sound source localization. The digital system 100 includes an audio capture component 102, a frequency weight determination component 104, a direction estimation component 106, and an estimation refinement component 108.

The audio capture component 102 includes functionality to capture two audio signals from two audio capture devices, e.g., analog microphones, digital microphones, microphone arrays, etc. In some embodiments, the audio capture component 102 includes functionality to convert captured analog audio signals to digital audio signals. The audio capture component 102 also includes functionality to provide the two digital audio signals to the frequency weight determination component 104 for further processing.

The frequency weight determination component 104 includes functionality to perform some front end processing on the two audio signals to partition the signals into processing "frames" and to determine weights for the frequency bands of each frame based on a calculated signal-to-noise ratio (SNR). The resulting frequency weights are provided to the direction estimation component 106. The functionality of this component is described in more detail in reference to FIG. 2.

The direction estimation component 106 includes functionality to apply GCC-PHAT modified with the frequency weights to estimate the TDOA of sound in a processing frame. The direction estimation component 106 additionally includes functionality to apply inter-frame adaptive filtering as part of the direction estimation to smooth out frame-to-frame maxima variations. The resulting TDOA estimation is provided to the estimation refinement component 108. The functionality of this component is described in more detail in reference to FIG. 2.

The estimation refinement component 108 includes functionality to perform some post-processing on the TDOA estimate to further improve the estimate if needed and to convert the resulting TDOA estimate to an angle representing the sound direction. The functionality of this component is described in more detail in reference to FIG. 2.

Figure 2:
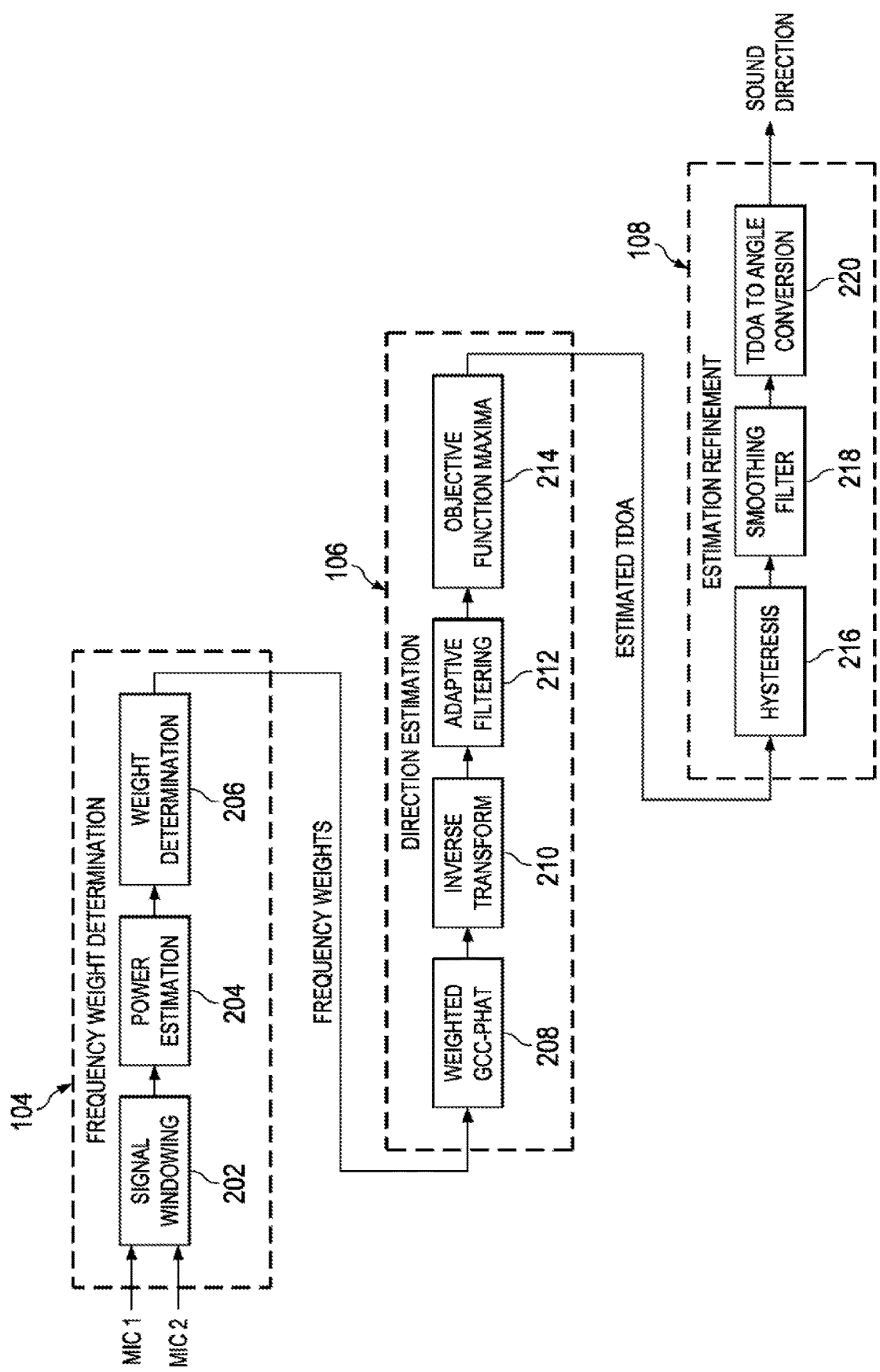

FIG. 2 is a block diagram illustrating components of the digital system of FIG. 1 in more detail. The frequency weight determination component 104 includes a signal windowing component 202, a power estimation component 204, and a weight determination component 206. The signal windowing component 202 includes functionality to convert the input signals into processing frames of frequency bands. More specifically, the input data is split into overlapping blocks and a windowing function is applied to the blocks. The offset between the successive data blocks is referred to as a processing "frame". The data in a processing frame is then converted to the frequency domain. Any suitable combination of a windowing function and a frequency conversion function may be used. In some embodiments, a Hamming windowing function and a fast Fourier transform (FFT), e.g., a 1024 point FFT, are used. In such embodiments, two FFTs are performed for each processing frame, one for each of the two input data channels.

The power estimation component 204 includes functionality to compute signal-to-noise ratios (SNR) for frequency bands in a processing frame and for the overall frame. More specifically, the power estimation component 204 divides a processing frame into multiple frequency bands. Any suitable number of frequency bands and band widths may be used. In some embodiments, each frame is split into thirteen frequency bands from 100 to 7000 Hz (Hertz) with the bands varying from 200 Hz to 1000 Hz at the lower and upper ends of the frequency spectrum, respectively.

The power estimation component 204 then estimates the signal power (energy) for each of the frequency bands and for the frame. Techniques for estimating signal power are well known and any suitable technique may be used. The power estimation component 204 also estimates the background noise in the frame. Any suitable technique may be used to estimate the background noise. In some embodiments, the background noise is determined as an initial noise-only measure in the expected environment. Background noise may also be determined, for example, by averaging the energy levels in low energy frames, e.g., by tracking frame energies over time and averaging over the frames that are relatively low-energy.

The power estimation component 204 then computes an SNR for each frequency band and for the frame based on the estimated background noise. For example, if the input signal is 16 kHz (kilohertz) and there are thirteen frequency bands, the power estimation component 204 computes fourteen SNR values for a frame, one for each frequency band and one over all frequencies in the frame. Calculation of SNR is well known and any suitable technique may be used. In some embodiments, the approximate SNR is computed by converting signal power to dB (decibels) and subtracting the background noise level in dB from the signal power in dB.

The weight determination component 206 includes functionality to determine frequency weights for a processing frame based on the SNR values computed by the power estimation component 204. The values of the frequency weights may be computed in any suitable way such that a higher SNR translates into a higher value weight for the corresponding frequency band. That is, the values are computed such that the weights emphasize the spectral components with strong signal presence (as compared to background noise), and deemphasize the spectral components with strong background noise. In some embodiments, the values of the frequency weights are binary values, i.e., 0 or 1, selected using one or more SNR thresholds. That is, the weight determination component 206 includes functionality to compare the SNR of a frequency band to a threshold SNR value and set the weight of that frequency band to one if the SNR is above the threshold and to 0 if the SNR is below the threshold. In some such embodiments, there is an SNR threshold value for each frequency band. Alternatively, in some such embodiments, a single SNR threshold value, e.g., 5 dB (decibels) is used for all frequency bands. Alternatively, in some such embodiments, there are multiple threshold SNR values where each threshold SNR value may be used for a corresponding subset of the bands.

In some embodiments, the weight determination component 206 includes functionality to compare the SNR for the overall frame to an overall SNR threshold. If the overall SNR is below this threshold, the sound source localization computation for the frame is terminated as there is not sufficient signal energy in the frame for a good sound direction estimate.

Any suitable threshold value or values may be used. As is explained below in more detail, the computed frequency weights are used to adjust the weighting of the standard GCC-PHAT TDOA computation. The standard GCC-PHAT effectively uses only the signal phase in its TDOA estimation, with all the phases contributing equally to the estimate regardless of their substance, i.e., the potentially random phase of noise is treated at par with the phase of the signal of interest. Use of the frequency weighting changes the TDOA computation such that all phases do not contribute equally to the estimate. These SNR-based weights select the spectral bands that are to be used in the TDOA estimation. In a noise free environment, best performance may be achieved with a high threshold value or values which eliminate frequency bands with weak signal. As the noise level increases and fewer frequency bands clear the thresholds, the estimates become increasingly unreliable and so it is then beneficial to lower the threshold value or values. For optimal performance, the threshold value or values may be set based on the expected environmental conditions in which the frequency weighted GCC-PHAT described herein is to be applied.

The direction estimation component 106 includes a weighted GCC-PHAT computation component 208, an inverse transform component 210, and adaptive filtering component 212, and an objective maxima determination component 214. The weighted GCC-PHAT computation component 212 includes functionality to compute frequency weighted GCC-PHAT values $G_k$ at each frequency band k as per $$G_k = W_k X_k Y_k^*$$

where $X_k$ and $Y_k$ represent the frequency transforms, e.g., FFTs, of the two input channels X and Y in each band k and $W_k$ is the combined frequency weight and PHAT weighting for each frequency band as per $$W_k = W_{k_{SNR}} W_{k_{PHAT}}$$

where $$W_{k_{PHAT}} = |X_k Y_k^*|^{-1}$$

where $Y_k^*$ is the complex conjugate of the Y input channel content in band k. The frequency weighted GCC-PHAT values $G_k$ are a frequency and PHAT weighted version of the frequency transform of the cross-correlation. The $G_k$ may also be referred to as the weighted cross spectrum.

The inverse transform component 210 includes functionality to convert the $G_k$ to the time domain, i.e., to perform the inverse of the frequency conversion function used by the signal windowing component 202. In embodiments in which an FFT is used for the frequency transformation in the signal windowing component 202, an inverse FFT (IFFT) is applied by the inverse transform component 210. Prior to converting the $G_k$ to the time domain, the inverse transform component 210 may up-sample the $G_k$ in the frequency domain by inserting zeros in the spectral representation. This interpolation increases the resolution of the TDOA estimate, and thus the resolution of the sound direction estimate. Any suitable up-sampling rate may be used. In some embodiments, the inverse transform component 210 uses a 4× up-sampling rate. The conversion of $G_k$ into the time domain is performed to obtain the TDOA objective function g(d).

The adaptive filtering component 212 includes functionality to adaptively filter the TDOA objective function g(d) to smooth out the frame-to-frame maxima variations in TDOA estimates. As is well known, the offset d of the maximum value of g(d) provides a TDOA estimate for a frame. The adaptive filtering component 212 applies inter-frame adaptive filtering to the TDOA objective function g(d) prior to the maximum search as per $$g(d) = \sum_{m=1}^{M} a_m g_m(d)$$

where M is the filter size, i.e., the number of previous frames, and the $a_m$ are the adaptive filter coefficients.

The inter-frame filtering is applied to smooth out the frame-to-frame maxima variations in the TDOA objective functions $g_m(d)$. The filtering is applied across corresponding elements of g(d) from multiple frames (which deemphasizes temporal maxima), not within each g(d) function (which could smear the maxima). Any suitable values of the filter coefficients $a_m$ may be used. In some embodiments, the filter coefficients $a_m$ are set to the signal power of the respective frames. Note that the frame signal power for each frame is computed by the power estimation component 204. This adaptive filtering may also be viewed as an amplitude-weighted average of the TDOA objective functions g(d) across frames. The advantages of such filtering include low-delay tracking of high-energy sound onsets and very low complexity.

As was previously mentioned in the description of the weight determination component 206, the sound source localization computation may not be performed for frames with insufficient signal energy. Thus, no objective function g(d) is computed for such frames. If such frames are included in the M frames used for the adaptive filtering, for all values of d for the frame m, $g_m(d)=0$.

The objective function maxima component 214 includes functionality to determine the initial TDOA estimate for a frame as the offset d of the maximum of the filtered objective function $\tilde{g}(d)$ as per $$TDOA = \operatorname*{argmax}_{d} \tilde{g}(d).$$

Since the maximum TDOA values are dependent on the speed of sound, microphone distance, and the sampling frequency, only a limited number of the filtered $\tilde{g}(d)$ objective function values are considered by the objective function maxima component 214 in determining the initial TDOA estimate. The number to be considered depends on such factors as the speed of sound, the distance between the two microphones, the input sampling frequency, and the up-sampling rate. For example, with the 344 m/s speed of sound, a 10 cm microphone separation, a 16 kHz input sampling frequency, and an up-sampling rate of 4, the maximum TDOA values to be considered are ±9 (19 potential values). With a 1024-point FFT, for example, the 1024× 4=4096 objective function data points in g(d) would therefore be reduced to only 19 points.

The estimation refinement component 108 includes a hysteresis component 216, a smoothing filter component 218, and a TDOA to angle conversion component 220. The hysteresis component 216 includes functionality to apply a hysteresis function to the TDOA estimate to help prevent frame-to-frame jitter between adjacent TDOA estimates. The TDOA estimate is kept unchanged from the last frame if it varies by less than a specified value, e.g., ±1, from the previous estimate; otherwise the new estimate is accepted.

The smoothing filter component 218 includes functionality to apply a smoothing filter to the TDOA estimate to further smooth out occasional spikes in the TDOA estimates. Any suitable smoothing filter may be used. In some embodiments, the smoothing filter component 218 implements a 5-tap median filter. A longer filter may be used if the resulting delay is acceptable. As was previously mentioned in the description of the weight determination component 206, the sound source localization computation may not be performed for frames with insufficient signal energy. Thus, TDOA values may not be available for some frames. In such instances, the last available valid TDOA value from a frame that had sufficient signal energy is used for the input to the median filter.

The TDOA to angle conversion component 220 includes functionality to convert the final TDOA estimate for a frame to an angle indicating the sound direction along the axis of the two microphones. Techniques for such a conversion are well known and any suitable technique may be used. For example, in some embodiments, the TDOA to angle conversion component 220 uses the well known far-field assumption of the sound source to calculate the angle of sound arrival. Calculation of the angle of sound arrival based on the far-field assumption is described, for example, in A. Pourmohammad and S. Ahadi, "Real Time High Accuracy 3-D PHAT-Based Sound Source Localization Using a Simple 4-Microphone Arrangement," *IEEE Systems Journal*, vol. 6, no. 3, pp. 455-468, September 2012.

Figure 3:
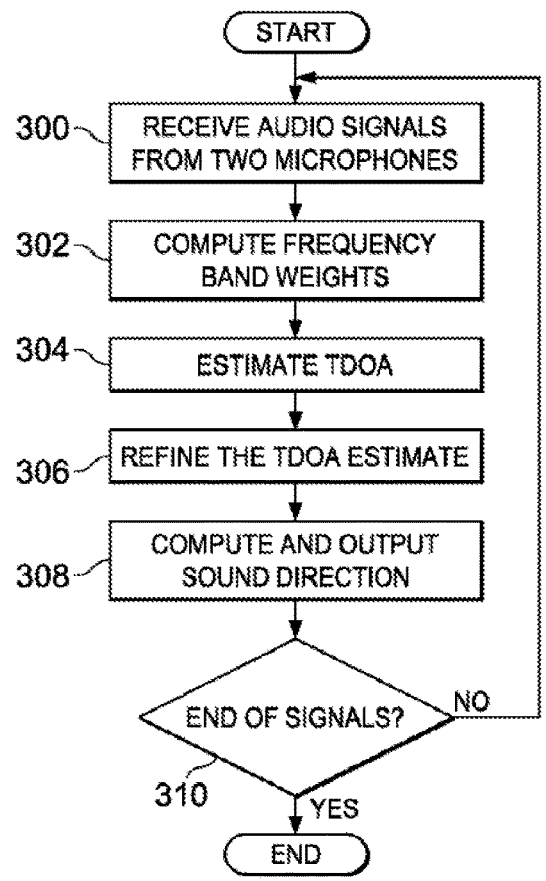
FIG. 3 is a flow diagram of a method.

FIG. 3 is a flow diagram of a method for sound source localization using two microphones. Initially, digital audio signals are received 300 from the two microphones. Frequency band weights are then computed 302 for a processing frame of the two audio signals. That is, a processing frame of frequency bands is generated from the two audio signals. Generation of a processing frame of frequency bands is previously described in more detail herein in reference to the signal windowing component 202 of FIG. 2. The signal power for each of the frequency bands is then estimated as well as the signal power for the frame as a whole. Background noise in the frame is also estimated. An SNR for each frequency band and for the frame is computed based on the estimated background noise. Signal power estimation and SNR computation is previously described in more detail herein in reference to the power estimation component 204 of FIG. 2. The frequency weights for the bands are then computed based on the corresponding SNR values. Computation of frequency weights from SNR values is previously described in more detail herein in reference to the weight determination component 206 of FIG. 2.

Although not specifically shown in FIG. 3, as further described herein in reference to the weight determination component 206 of FIG. 2, in some embodiments, the SNR computed for the frame is compared to a threshold to determine if there is sufficient signal power in the frame to compute a sound direction for the frame. If this test indicates that there is not sufficient power, processing continues with the next frame.

The TDOA value for the frame is then estimated 304 using the computed frequency band weights. This estimation begins with computation of frequency weighted GCC-PHAT values for each frequency band in the frame. Computation of such values is previously described in more detail herein in reference to the weighted GCC-PHAT computation component 208 of FIG. 2. The frequency weighted values are then up-sampled and converted to the time domain to obtain the TDOA objective function. This process is previously described in more detail herein in reference to the inverse transform component 210 of FIG. 2. To complete this initial TDOA estimate, the TDOA objective function is adaptively filtered to smooth frame-to-frame maxima variations in TDOA estimates. This adaptive filtering is previously described in more detail herein in reference to the adaptive filtering component 212 of FIG. 2.

The TDOA estimate is then refined 306 and the sound direction for the frame is computed from the refined TDOA. Post-processing to refine a TDOA estimate is previously described in more detail herein in reference to the hysteresis component 216 and the smoothing filter component 218 of FIG. 2.

The sound direction value is then computed 308 and output for further processing in an application using the computed sound directions for some purpose. For example, the sound direction may be used to determine whether or not the position of a camera should be changed to move in the computed direction for applications such as video surveillance or video teleconferencing. In other example applications, the sound direction may be used to focus the attention of a robot toward an identified human voice or other sound or may be used in a beamforming noise-suppressor to steer in the sound-of-interest direction to enhance its noise reduction performance. Computation of sound direction from the TDOA estimate is previously described in more detail herein in reference to the TDOA to angle conversion component 220 of FIG. 2. Processing may then continue with another frame unless audio signals are no longer being received 310.

An embodiment of the above described sound source localization was tested using certain settings/assumptions including 10 cm microphones spacing, 16 kHz audio sampling frequency, a 1024-point FFT, and 16 Hz analysis rate (1000 samples window shift). Further, a 4× frequency-domain up-sampling rate was used to increase the effective sampling frequency to 64 kHz, and an additional up-sampling for the post-processing hysteresis further increases the effective sampling frequency to 128 kHz. With the sound speed of 343 m/s, these settings provide an angle resolution (after the hysteresis) of about 3 degrees near the center, and 15 degrees near the ±90 angles. As previously mentioned, the far-field assumption requires at least 47 cm distance between sound and microphones.

For these tests, the frequency bandwidth of a frame was split into thirteen frequency bands from 100 to 7000 Hz (with the bands varying from 200 Hz to 1000 Hz at the lower and upper ends of the spectrum, respectively). Further, a single SNR threshold of 5 dB was used to set binary frequency weights for each of the thirteen frequency bands. The inter-frame adaptive filter coefficients are set to the signal power of the eight most recent frames. The smoothing filter was a median filter with five taps. These settings at 16 kHz audio sampling frequency take about 5 MIPS processing power in a fixed-point implementation.

Figure 4A:
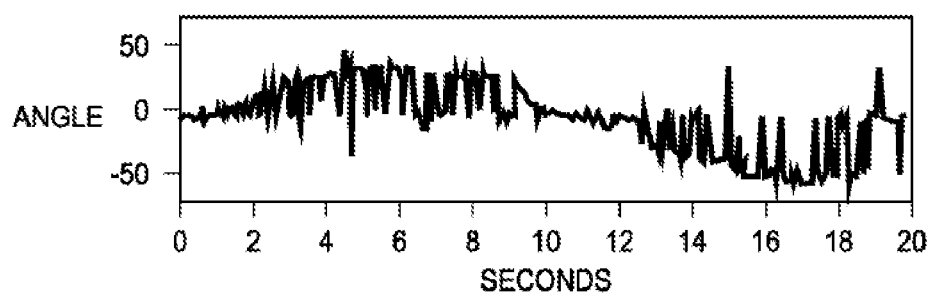
FIGS. 4A-4D are graphs.
Figure 4B:
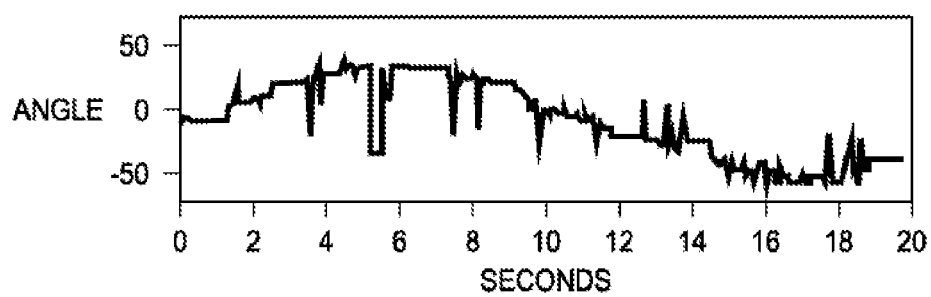

A performance example of the embodiment with the above settings is presented in graphs of FIGS. 4A-4D. This example represents a 20 second recording of a moving speaker in fairly quiet office environment. As the speaker moves from the center to the left and then to the right, the desired result is a steady sound-direction estimate that tracks the sound location. In FIG. 4A, the estimate obtained from the prior art GCC-PHAT algorithm is shown. This estimate is very noisy with many excursions from the correct sound direction. FIG. 4B shows the estimate with the SNR-based frequency weighting applied. As can be observed from this graph, the number of excursions from the sound path is significantly reduced. A comparison with the graph of FIG. 4A illustrates a weakness of the prior art GCC-PHAT algorithm, i.e., as the amplitude spectrum is normalized through the PHAT transformation, frequencies representing the signal of interest and those with mostly noise get similar consideration. By emphasizing the frequencies with high SNR and deemphasizing low-SNR frequency bands via the SNR-based frequency weights, the overall estimate can be significantly improved.

Figure 4C:
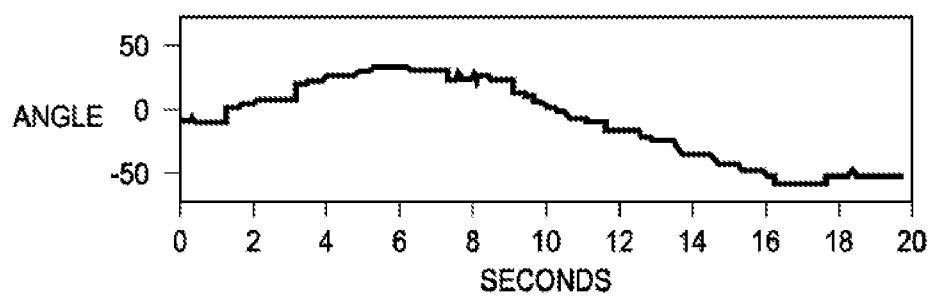
Figure 4D:
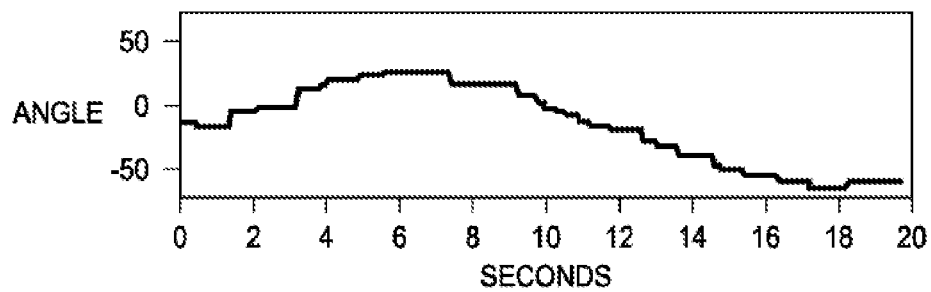

FIG. 4C shows additional performance improvement from application of the inter-frame adaptive filtering. As can be observed from this graph, the within-estimator filtering significantly smoothes out undesired frame-to-frame variations of the objective function and provides a steadier sound-direction estimate. Finally, FIG. 4D presents the estimation after post-processing (hysteresis and median-filter). As can be observed from this graph, the post-processing removes occasional small variations in the TDOA estimate providing an even smoother final outcome. Notice, for example, the variations in FIG. 4C around the 8$^{th}$ second being smoothed out in FIG. 4D.

Additional tests were performed to determine the expected performance of the embodiment in clean and noisy conditions. Five female and five male speakers were recorded while slowly moving around the microphones (left and right, closer and further away). Four background noises were also recorded with the same microphone configuration. To simulate a defused character of the noise, multiple loudspeakers were used facing away from the microphones. Babble, car, office, and street noises were recorded. The background noise was then mixed with the speech at SNR levels from 25 to 5 dB.

For the clean conditions, the average value of frame-to-frame angle change was calculated as this is a good simple performance indicator for a stationary or slowly moving sound source. When the estimator matches the slowly-moving sound direction well, the average angle change is low; as performance deteriorates, more and more excursions from the correct values increase this average. Note that the average angle change heavily depends on the test material so it is not suitable to be an objective performance measure in itself. It is, however, a helpful indicator that under given test conditions one estimator performs better than another, and is a good indicator of when an algorithm may be starting to break down. The average per-second frame-to-frame angle change for the prior art GCC-PHAT, with SNR-based frequency weighting added, with inter-frame filtering added, and with the post processing added is shown in Table 1. The 2.3°/sec average angle change resulting from the embodiment implementation is a much more stable outcome than the reference 110.4°/sec prior art GCC-PHAT estimate. The large average angle change of the prior art GCC-PHAT is caused by the frequent excursions from the correct sound direction as can be observed in FIG. 4A.

TABLE 1

| GCC-PHAT | plus SNR weighting | plus inter-frame filtering | plus post-processing |
| --- | --- | --- | --- |
| 110.4 | 79.8 | 4.6 | 2.3 |

TABLE 2

| SNR | babble | car | office | street |
| --- | --- | --- | --- | --- |
| 25 | 0.2 | 0.1 | 0.2 | 0.2 |
| 20 | 0.4 | 0.2 | 0.4 | 0.5 |
| 15 | 0.9 | 0.6 | 0.8 | 0.7 |
| 10 | 1.4 | 1.1 | 1.6 | 1.2 |
| 5 | 3.0 | 2.0 | 4.2 | 5.2 |

For the noisy conditions, the average per-frame angle difference between the clean speech direction and the corresponding estimates with background noise added was calculated. Table 2 summarizes these differences for each background noise and SNR level. Understandably, the difference increases with increased noise level. Most of the time, the angle estimates for clean and noisy speech are in fact the same—the difference mostly occurs in timing of the transitions between angles as a speaker moves around. For reference, the average clean-speech per-frame angle difference between the implemented embodiment and the prior art GCC-PHAT for the tested data set was 15°/frame (much higher than the maximum 5.2°/frame for street noise at 5 dB SNR) which is again due to the frequent excursions of the prior art GCC-PHAT estimate from the correct angle. The relatively low angle differences in Table 2, even for high noise levels, shows that the implemented embodiment maintains stable performance even in considerable background noise.

The values of the previously mentioned parameters may be implementation dependent. Various combinations were tested and showed fairly consistent performance across a wide range of settings. A desired combination of values may be selected based on the required angle resolution, microphone spacing, and the expected noise environment, as well as computational complexity and delay constraints.

Figure 5:
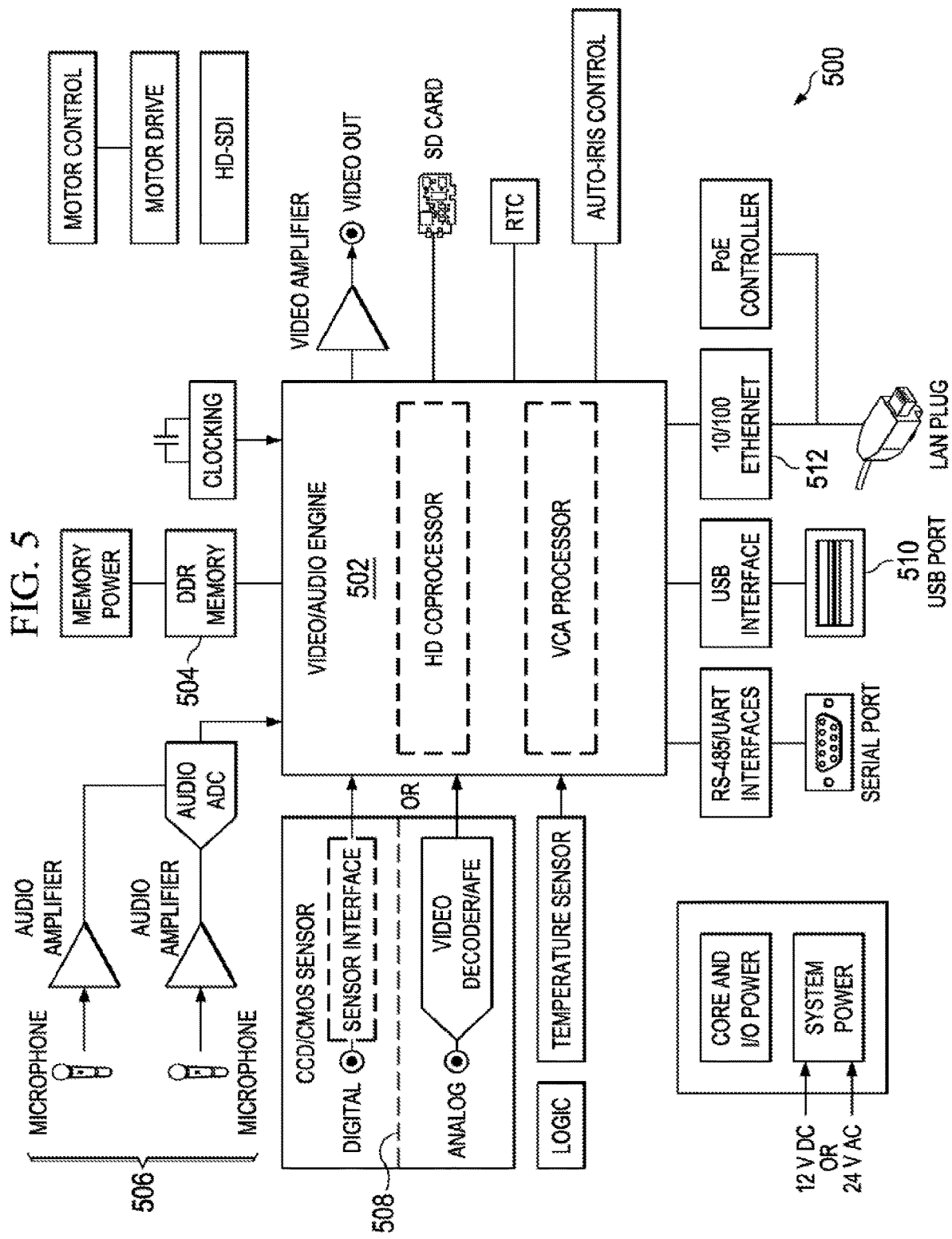
FIG. 5 is a block diagram of an illustrative digital system.

FIG. 5 is a block diagram of an example digital system 500 that may be configured to perform an embodiment of sound source localization as described herein as part of the computations needed to move a camera in the direction of a localized sound source. The example digital system 500 is an example of a video camera design based on a system-on-a chip (SoC), i.e., the video/audio engine 502. This video/audio engine 502 may be, for example, an SoC from a family of DaVinci™ Digital Media Processors available from Texas Instruments, Inc. The video/audio engine 502 is a programmable platform designed to meet the processing needs of applications such as video surveillance, video conferencing, video gaming, etc. The video/audio engine 502 includes multiple processing cores, e.g., a RISC processing core, a DSP processing core, and one or more high definition (HD) video imaging co-processors, with shared on-chip memory for programmable video and audio processing.

The digital system 500 includes two microphones 506 and associated audio signal conversion logic that may be used to capture sound in a scene being captured by the imaging sensors 508. Software instructions stored in the off-chip memory 504 and executable by one or more processing cores on the video/audio engine 502 may implement an application that monitors sound in the scene being captured by the imaging sensors 508. The application may include functionality to move the camera as needed to focus in areas of the scene where sounds of interest are detected. The application may implement an embodiment of a method for sound source localization as described herein to process audio signals from the two microphones 506 in order to estimate the location of sounds in the scene.

The software instructions may be distributed to the digital system 500, for example, via a computer readable medium connected via the USB port 510 or via a transmission path from computer readable media on another digital system via the Ethernet interface 512.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will understand embodiments in which one or both of the above-described SNR-based frequency weighting and adaptive inter-frame filtering may be used with other time or frequency domain TDOA estimators. For example, the TDOA estimator may be GCC without the PHAT weighting.

In another example, one of ordinary skill in the art will understand embodiments in which the SNR-based frequency weighting is used with a TDOA estimator but the adaptive inter-frame filtering is not used. Similarly, one of ordinary skill in the art will understand embodiments in which the adaptive inter-frame filtering is used with a TDOA estimator and the SNR-based frequency weighting is not used.

Embodiments of the methods and system components, i.e., the frequency weight determination component 104, the direction estimation component 106, and the estimation refinement component 108 of FIG. 1, for sound source localization described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:
1. A method comprising:
receiving, with one or more processors, audio signals from two audio capture devices;
converting, with the one or more processors, the audio signals into a processing frame by:
splitting the audio signals into overlapping blocks;
applying a windowing function to the overlapping blocks; and
storing the offset between the windowed blocks as the processing frame;
dividing the audio signals, in the processing frame, into multiple specified continuous frequency bands, each of the frequency bands including multiple frequency components;
computing, with the one or more processors, a generalized cross-correlation with phase transform (GCC-P HAT) and a signal-to-noise ratio (SNR) for each of the frequency bands;
setting, with the one or more processors, a value of a frequency band weight for a corresponding one of the frequency bands to one when the SNR computed for the corresponding frequency band indicates sufficient signal power in the corresponding frequency band to meet a threshold for contribution to a sound direction estimate;
setting, with the one or more processors, the value of the frequency band weight for the corresponding frequency band to zero when the SNR computed for the corresponding frequency band does not indicate sufficient signal power in the corresponding frequency band to meet a threshold for contribution to a sound direction estimate;
determining, with the one or more processors, a weighted GCC-PHAT value for each of the frequency bands based on the GCC-PHAT for the respective frequency band and the frequency band weight for the respective frequency band;
up-sampling, with the one or more processors, the weighted GCC-PHAT value for each of the frequency bands by inserting zeroes in a spectral representation of the weighted GCC-PHAT value for each of the frequency bands;
converting, with the one or more processors, the up-sampled weighted GCC-PHAT value for each of the frequency bands into a time domain;

computing, with the one or more processors, an estimated time delay of arrival (TDOA) of sound for the processing frame using the time domain up-sampled weighted GCC-PHAT value for each of the frequency bands; and converting, with the one or more processors, the estimated TDOA to an angle representing sound direction.

2. A method comprising:

receiving, with one or more processors, audio signals from two audio capture devices;

converting, with the one or more processors, the audio signals into a processing frame by:
   splitting the audio signals into overlapping blocks;
   applying a windowing function to the overlapping blocks; and
   storing the offset between the windowed blocks as the processing frame;

dividing the audio signals, in the processing frame, into multiple specified continuous frequency bands, each of the frequency bands including multiple frequency components;

computing, with the one or more processors, a generalized cross-correlation with phase transform (GCC-PHAT) and a signal-to-noise ratio (SNR) for each of the frequency bands in the processing frame of the audio signals;

determining, with the one or more processors, a frequency band weight for each of the frequency bands based on the SNR computed for the frequency band;

determining, with the one or more processors, a weighted GCC-PHAT value for each of the frequency bands based on the GCC-PHAT for the respective frequency band and the frequency band weight for the respective frequency band;

up-sampling, with the one or more processors, the weighted GCC-PHAT value for each of the frequency bands by inserting zeroes in a spectral representation of the weighted GCC-P HAT value for each of the frequency bands;

converting, with the one or more processors, the up-sampled weighted GCC-PHAT value for each of the frequency bands into a time domain;

obtaining, with the one or more processors, an estimated time delay of arrival (TDOA) objective function based on the time domain up-sampled weighted GCC-PHAT value for each of the frequency bands;

applying, with the one or more processors, an adaptive inter-frame filter to the TDOA objective function to obtain a filtered TDOA objective function;

computing, with the one or more processors, an estimated TDOA based on the filtered TDOA objective function; and converting, with the one or more processors, the estimated TDOA to an angle representing sound direction, wherein coefficients of the adaptive inter-frame filter are respective signal powers of a plurality of processing frames preceding the processing frame.

3. A method comprising:

receiving, with one or more processors, audio signals from two audio capture devices;

converting, with the one or more processors, the audio signals into a processing frame by:
   splitting the audio signals into overlapping blocks;
   applying a windowing function to the overlapping blocks; and
   storing the offset between the windowed blocks as the processing frame;

dividing the audio signals, in the processing frame, into multiple specified continuous frequency bands, each of the frequency bands including multiple frequency components;

computing, with the one or more processors, a generalized cross-correlation with phase transform (GCC-P HAT) and a signal-to-noise ratio (SNR) for each of the frequency bands;

determining, with the one or more processors, a frequency band weight for each of the frequency bands based on the SNR computed for the frequency band;

determining, with the one or more processors, a weighted GCC-PHAT value for each of the frequency bands based on the GCC-PHAT for the respective frequency band and the frequency band weight for the respective frequency band;

up-sampling, with the one or more processors, the weighted GCC-PHAT value for each of the frequency bands by inserting zeroes in a spectral representation of the weighted GCC-PHAT value for each of the frequency bands;

converting, with the one or more processors, the up-sampled weighted GCC-PHAT value for each of the frequency bands into a time domain;

determining, with the one or more processors, a time delay of arrival TDOA objective function for the processing frame of the audio signals based on the time domain up-sampled weighted GCC-PHAT value for each of the frequency bands;

applying, with the one or more processors, an adaptive inter-frame filter to the TDOA objective function to obtain a filtered TDOA objective function, wherein coefficients of the adaptive inter-frame filter are respective signal powers of a plurality of processing frames preceding the processing frame;

computing, with the one or more processors, an estimated TDOA based on the filtered TDOA objective function; and converting, with the one or more processors, the estimated TDOA to an angle representing sound direction.

4. A digital system comprising:

two audio capture devices for capturing audio signals;

means for converting, with the one or more processors, the audio signals into a processing frame by:
   splitting the audio signals into overlapping blocks;
   applying a windowing function to the overlapping blocks; and
   storing the offset between the windowed blocks as the processing frame;

means for dividing the audio signals, in the processing frame, into multiple specified continuous frequency bands, each of the frequency bands including multiple frequency components;

means for computing a generalized cross-correlation with phase transform (GCC-PHAT) and a signal-to-noise ratio (SNR) for each of the frequency bands;

means for determining a frequency band weight for each of the frequency bands based on the SNR computed for the frequency band;

means for determining a weighted GCC-PHAT value for each of the frequency bands based on the GCC-PHAT for the respective frequency band and the frequency band weight for the respective frequency band;

means for up-sampling the weighted GCC-P HAT value for each of the frequency bands by inserting zeroes in a spectral representation of the weighted GCC-PHAT value for each of the frequency bands;

means for converting the up-sampled weighted GCC-PHAT value for each of the frequency bands into a time domain;

means for obtaining a time delay of arrival TDOA objective function for the processing frame of the audio signals based on the time domain up-sampled weighted GCC-PHAT value for each frequency band;

means for applying an adaptive inter-frame filter to the TDOA objective function to obtain a filtered TDOA objective function, wherein coefficients of the adaptive inter-frame filter are respective signal powers of a plurality of processing frames preceding the processing frame;

means for computing an estimated TDOA based on the filtered TDOA objective function; and means for converting the estimated TDOA to an angle representing sound direction.

5. A digital system comprising:

two audio capture devices for capturing audio signals;

means for converting the audio signals into a processing frame by:
  splitting the audio signals into overlapping blocks;
  applying a windowing function to the overlapping blocks; and
  storing the offset between the windowed blocks as the processing frame;

means for dividing the audio signals, in the processing frame, into multiple specified continuous frequency bands, each of the frequency bands including multiple frequency components;

means for computing a generalized cross-correlation with phase transform (GCC-PHAT) and a signal-to-noise ratio (SNR) for each of the frequency bands;

means for setting a value of a frequency band weight for a corresponding one of the frequency bands to one when the SNR computed for the corresponding frequency band indicates sufficient signal power in the corresponding frequency band to meet a threshold for contribution to a sound direction; and means for setting the value of the frequency band weight to zero when the SNR computed for the frequency band does not indicate sufficient signal power in the frequency band to meet a threshold for contribution to a sound direction;

means for determining a weighted GCC-PHAT value for each of the frequency bands based on the GCC-P HAT for the respective frequency band and the frequency band weight for the respective frequency band;

means for up-sampling the weighted GCC-P HAT value for each of the frequency bands by inserting zeroes in a spectral representation of the weighted GCC-PHAT value for each of the frequency bands;

means for converting the up-sampled weighted GCC-PHAT value for each of the frequency bands into a time domain;

means for obtaining a time delay of arrival (TDOA) objective function for a processing frame of the audio signals based on the time domain up-sampled weighted GCC-PHAT value for each of the frequency bands;

means for applying an adaptive inter-frame filter to the TDOA objective function to obtain a filtered TDOA objective function;

means for computing an estimated TDOA based on the filtered TDOA objective function; and means for converting the estimated TDOA to an angle representing sound direction.

* * * * *